United States Patent [19]

Westfall et al.

[11] Patent Number: 5,155,849
[45] Date of Patent: Oct. 13, 1992

[54] MULTILINGUAL OPERATOR PROMPTING SYSTEM WHICH COMPARES LANGUAGE CONTROL FILE VERSION NUMBERS IN DOCUMENT AND MASS MEMORY FOR CHANGING LANGUAGE FILES

[75] Inventors: Robert S. Westfall, Rochester; Dale T. Platteter, Fairport; Richard K. Patterson, Penfield; Eugene L. Smith; John R. Hill, Jr., both of Rochester, all of N.Y.

[73] Assignee: Xerox Corporation, Stamford, Conn.

[21] Appl. No.: 338,910

[22] Filed: Apr. 14, 1989

[51] Int. Cl.⁵ ............................................. G06F 15/38
[52] U.S. Cl. .................................... 395/600; 364/226.4; 364/237.2; 364/237.82; 364/235.7; 364/DIG. 1; 395/500; 395/650
[58] Field of Search ... 364/200 MS File, 900 MS File; 395/600, 500, 650

[56] References Cited

U.S. PATENT DOCUMENTS

| | | | |
|---|---|---|---|
| 3,979,729 | 9/1976 | Eaton et al. | 340/172.5 |
| 4,195,353 | 3/1980 | Abe | 364/900 |
| 4,196,450 | 4/1980 | Miller | 358/453 |
| 4,231,087 | 10/1980 | Hunsberger | 364/200 |
| 4,365,315 | 12/1982 | Jamnik | 364/900 |
| 4,475,806 | 10/1984 | Daughton | 340/715 |
| 4,484,305 | 11/1984 | Ho | 364/900 |
| 4,507,734 | 3/1985 | Kaldas | 364/900 |
| 4,583,194 | 4/1986 | Cage | 364/900 |
| 4,665,501 | 5/1987 | Saldin | 364/900 |
| 4,699,501 | 10/1987 | Watanabe et al. | 355/14 R |
| 4,711,560 | 12/1987 | Hosaka et al. | 355/14 C |
| 4,730,212 | 3/1988 | Wojcik | 358/83 |
| 4,731,735 | 3/1988 | Borgendale | 364/200 |
| 4,787,050 | 11/1988 | Suzuki | 364/900 |
| 4,809,220 | 2/1989 | Carlson | 364/900 |
| 4,864,503 | 9/1989 | Tolin | 364/900 |
| 4,941,249 | 8/1990 | McClung | 364/900 |
| 4,999,554 | 3/1991 | Naka | 364/474.06 |

FOREIGN PATENT DOCUMENTS 61-190352 8/1986 Japan .
61-196265 8/1986 Japan .

*Primary Examiner*—Thomas O. Lee
*Assistant Examiner*—Eric Coleman
*Attorney, Agent, or Firm*—Ronald F. Chapuran

[57] ABSTRACT

The method of changing system files to be able to change either the primary or secondary language or both on a rigid disk to another language, and to provide the operator with the option of selecting either the primary or secondary language as the medium for the display messages and prompts by providing the language requirements on a floppy disk, identifying the specific files of the control to be altered to produce the language requirements, loading the floppy disk into a floppy disk drive, and transferring the language requirements to the rigid disk.

3 Claims, 7 Drawing Sheets

MULTILINGUAL OPERATOR PROMPTING SYSTEM WHICH COMPARES LANGUAGE CONTROL FILE VERSION NUMBERS IN DOCUMENT AND MASS MEMORY FOR CHANGING LANGUAGE FILES

BACKGROUND OF THE INVENTION

The invention relates to a system for controlling a reproduction machine, and more particularly, to a method for changing the control for alternate display of alternate languages of such reproduction machines.

As reproduction machines such as copiers and printers become more complex and versatile in features and capability, the machine software control becomes much more complex. Yet, modifications and upgrades to the control often become more desirable or necessary to refine and adjust old features or add new features. In addition, many of the machines are multi-national and include a user interface that must not only be capable of displaying text and graphics, but, in particular, be capable of displaying graphics in multiple languages.

U.S. Pat. No. 3,979,729 discloses an index store provided to translate index addresses, derived from input instructions, into start addresses for microprogram routines. If microprogram routines have to be re-ordered within the microprogram store, it is only necessary to modify the contents of the index store, and further modifications to the microprogram unit, or to the input instructions, are not necessary.

The prior art also discloses various means to store or load control data into a system. For example, U.S. Pat. No. 4,711,560 discloses a copier which functions according to a sequence control program stored on floppy disk and loaded by a user. The floppy disk can also contain a diagnostic program to facilitate maintenance, and further act as a key to prevent unauthorized use of the copier.

Japanese Patent No. 61-196265 to Watanabe discloses a copying machine having a disk drive for accepting a disk which stores language information. When the disk is loaded, display message information in various languages is provided on an operator interface display. U.S. Pat. No. 4,699,501 to Watanabe et al. claims priority from, inter alia, the '265 Japanese reference and is closely related.

Japanese Patent No. 61-190352 to Watanabe discloses disk means for inputting operation guidance data to a copying machine.

A difficulty with the prior art techniques is the limitation in being able to change control code, and, in particular, the inability to provide a simple method to change the code to provide alternate language displays at the user interface. It would be particularly advantageous to be able to change the language not only at the manufacturing site, but also to make the change to the control code in machines already installed in the field.

It would be desirable, therefore, to be able to easily re-install or replace the code controlling the specific language displayed at a user interface. It would also be desirable to selectively install customer language options in the field as required and to be able to provide a simple means for switching language displays during or after installation of the machine at the customer site.

It is an object of the present invention, therefore, to provide a new and improved mechanism to allow the option of selecting either a primary or secondary language at a user interface and to allow changing either the primary or secondary language to an alternative language available for the various messages and instructions at the user interface. Further advantages of the present invention will become apparent as the following description proceeds and the features characterizing the invention will be pointed out with particularity in the claims annexed to and forming a part of this specification.

SUMMARY OF THE INVENTION

Briefly, the present invention is concerned with an image processing apparatus having image processing means for forming an image, a controller including a rigid disk having a plurality of system files for controlling the image processing means, and in particular, to the method of providing both a primary and a secondary language on the rigid disk and to the method of changing the system files to be able to change either the primary or secondary language or both on the rigid disk to another language, and to provide the operator with the option of selecting either the primary or secondary language as the medium for the display messages and prompts by providing the language requirements on a floppy disk, identifying the specific files of the control to be altered to produce the language requirements, loading the floppy disk into a floppy disk drive, and transferring the language requirements to the rigid disk.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
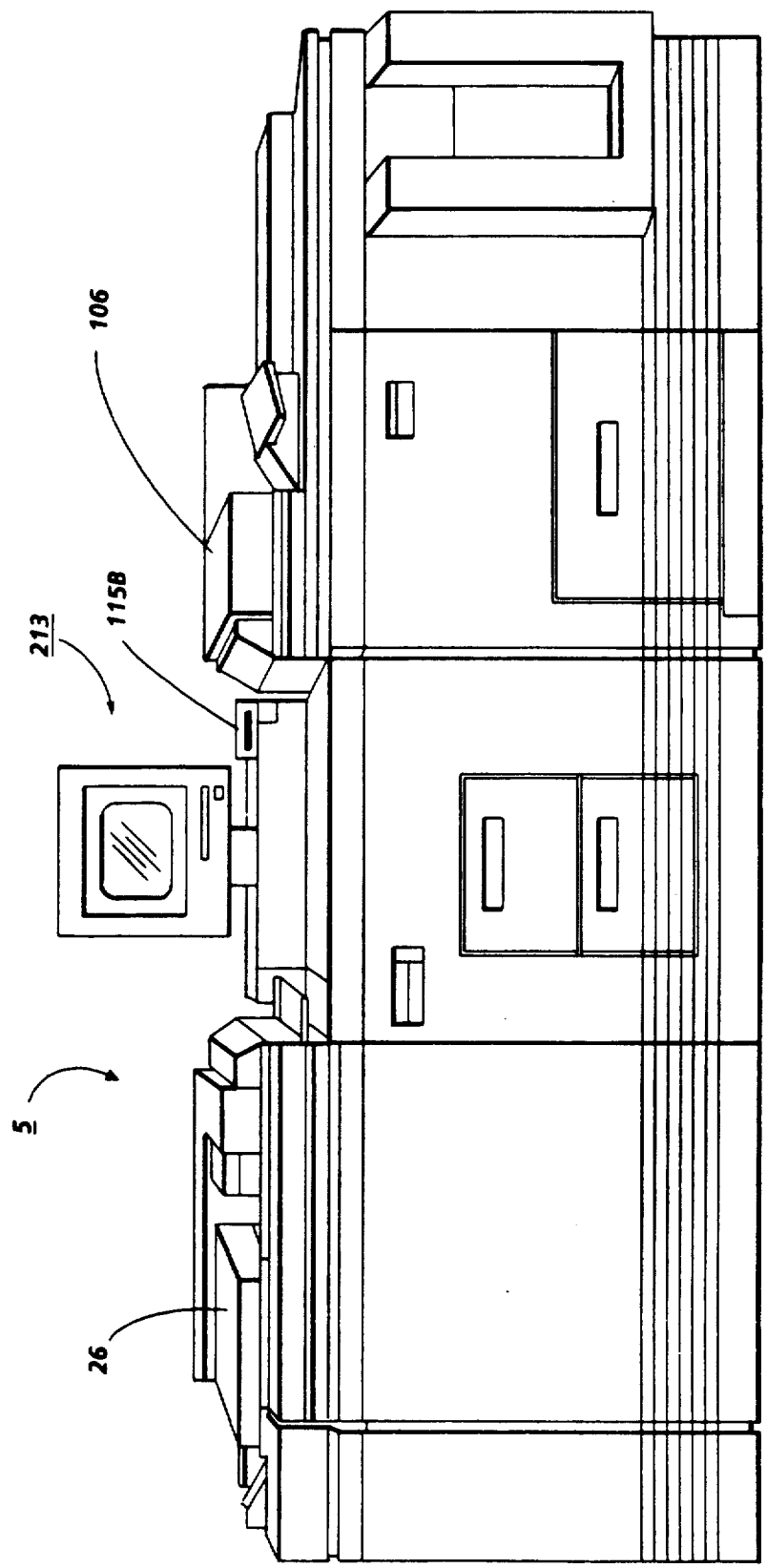
FIG. 1 is an isometric view of an illustrative reproduction machine incorporating the present invention.
Figure 2:
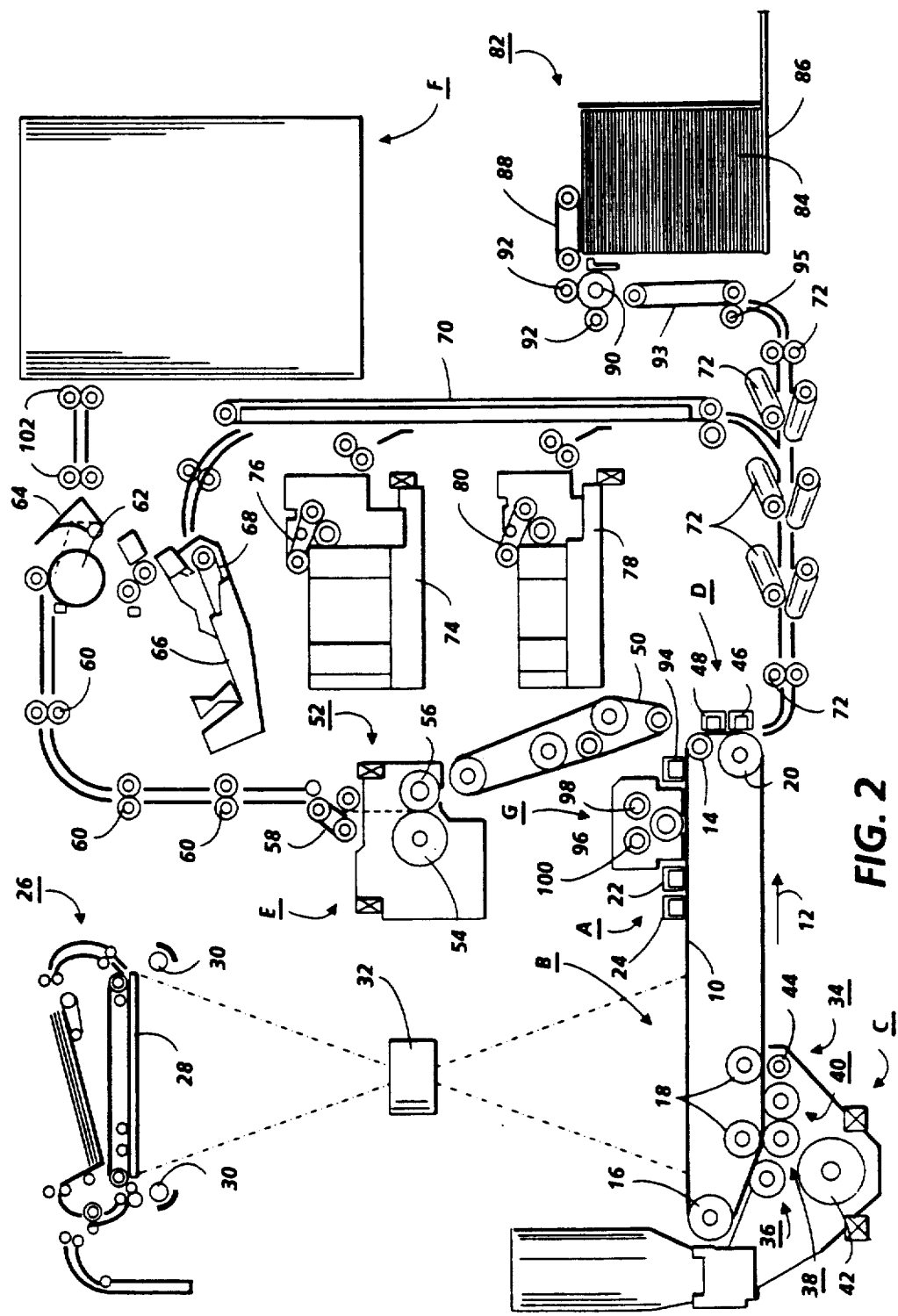
FIG. 2 is a schematic elevational view depicting various operating components and subsystems of the machine shown in FIG. 1.

For a general understanding of the features of the present invention, reference is made to the drawings. Referring to FIGS. 1 and 2, there is shown an electrophotographic reproduction machine 5 composed of a plurality of programmable components and subsystems which cooperate to carry out the copying or printing job programmed through a touch dialogue User Interface (U.I.).

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a precharge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

The various functions of machine are regulated by a controller which preferably comprises one or more programmable microprocessors. The controller provides a comparison count of the copy sheets, the number of documents being recirculated, the number of copy sheets selected by the operator, time delays, and jam corrections. Programming and operating control over machine is accomplished through the User Interface. Operating and control information is stored in a suitable memory and loaded into controller and job programming instructions are loaded into the controller through the User Interface. Conventional sheet path sensors or switches may be utilized to keep track of the position of the documents and the copy sheets. In addition, the controller regulates the various positions of the gates depending upon the mode of operation selected.

Figure 3:
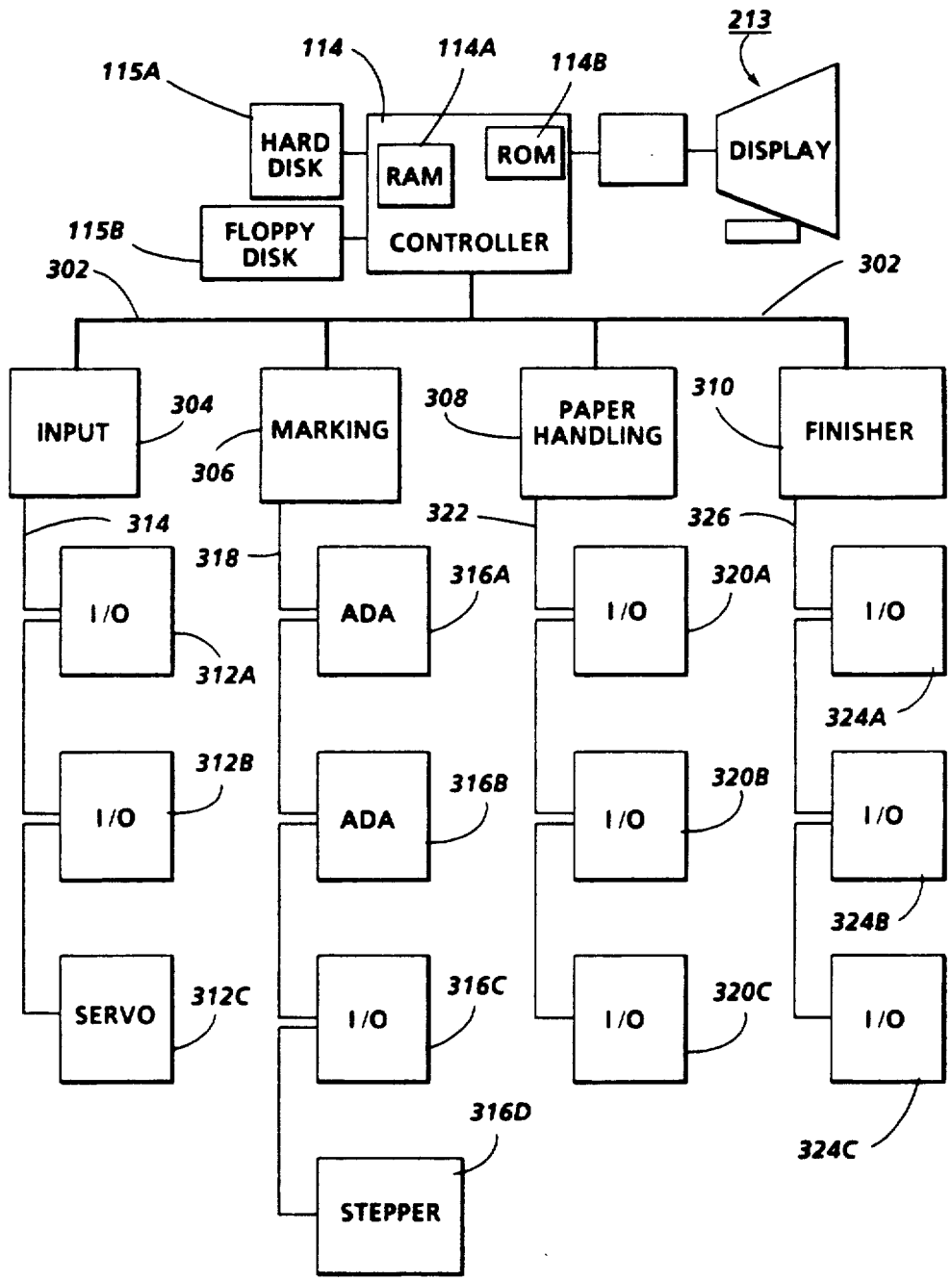
FIG. 3 is a block diagram of the operating control systems and memory for the machine shown in FIG. 1.

With reference to FIG. 3, the memory includes a hard or rigid disk drive 115A for receiving suitable rigid memory disks and a floppy disk drive 115B for receiving suitable floppy memory disks, both disk drives being electrically connected to Controller 114, the Controller 114 including RAM 114A and ROM 114B. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. In normal machine operation, all of the control code and screen display information for the machine is loaded from the rigid disk at machine power up. Alternatively, all of the control code and screen display information for the machine can be loaded from a floppy disk at machine power up using the floppy disk drive built into the machine. Suitable display 213A is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output (I/O) devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326. For further details of the control, reference may be had to U.S. Ser. No. 07/164,365 filed Mar. 4, 1988 and incorporated herein.

Figures 4, 5:
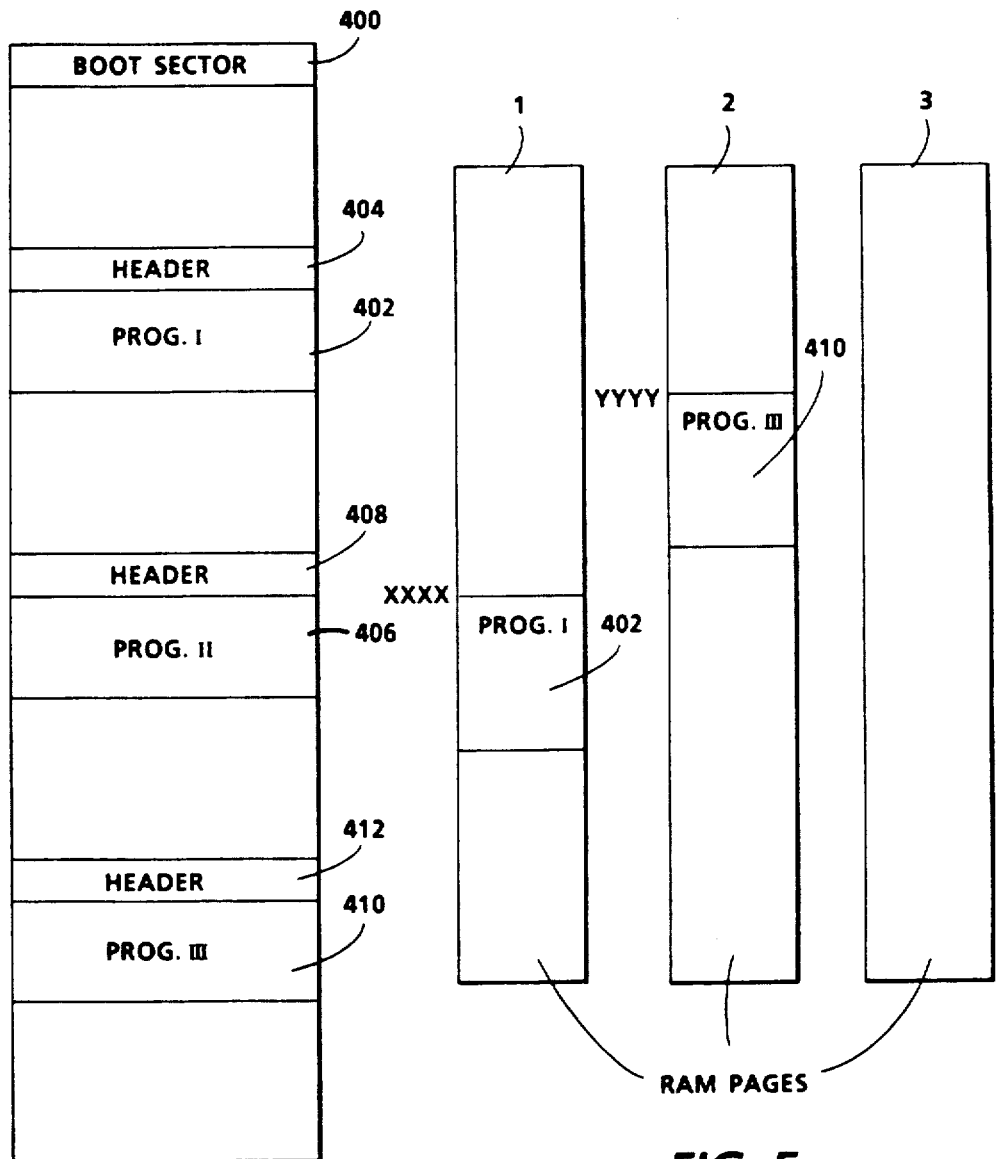
FIG. 4 is an illustration of floppy disk memory allocation.
FIG. 5 is an illustration of RAM page memory allocation.

To load the control code from a floppy disk, the floppy disk is loaded into the floppy disk drive 115B. With reference to FIG. 4, there is an illustration of the memory allocation on a floppy disk loaded into the floppy disk drive 115B. A header sector or boot sector 400 is allocated to the location of that portion of the floppy disk that is initially read. A plurality of programs or code segments are also allocated on the floppy disk as illustrated by program I-402 with its header sector 404, Program II-406 with its header sector 408, and Program III-410 with its header 412. The header sectors 404, 408 and 412 contain information concerning where to load the file in RAM 114A and at what page in memory to load, if it is booted.

Typically, the random access memory is segmented into a plurality of RAM pages, as illustrated in FIG. 5, and the read in code is located or stored at a specific location on a specific RAM page. By way of illustration, Program I-402 from the floppy disk is illustrated as being stored in RAM page 1 beginning at the address XXXX and Program III-410 from the floppy disk is illustrated as being allocated to the RAM page 2 beginning at address YYYY. It should be noted that Program II-406 on the floppy disk is assumed to be a program that is indicated in the header 408 not to be booted into RAM 114A.

It should also be noted that even though various portions of systems software to operate the reproduction machine are being loaded from the floppy disk onto the RAM 114A of controller 114, it is necessary to have a small portion of the systems software residing in the controller 114 as illustrated by ROM 114B in FIG. 3. Thus, when the machine is initially turned on, the portion of systems software in ROM 114B initiates the operation of the controller 114 to initiate the first necessary booting operations, i.e. the systems control residing in ROM 114B at start-up begins the operation of the floppy disk drive, and reads at least the initial boot sector 400 on the outer edge of a floppy disk.

The boot sector 400 also known as the boot record generally resides as the very first sector on the disk. This boot sector contains the information about the disk, specifically, the logic of how to load bootable files. In addition, a file directory contains information identifying which files on the disk are to be booted from the disk to RAM, and a file header for each file contains the location in RAM where the file is to be loaded. That is, the boot sector contains the minimal amount of code, called a boot loader, required to search the floppy disk directory for those files that are directly loadable into RAM and instructs the boot ROM 114B to load these particular files into designated memory locations or segments in RAM 114A identified by the file header. At the completion of loading all the directly loadable files, the boot sector 400 then instructs the boot ROM 114B to verify that all the segments loaded into RAM are a functional system. That is, the boot sector instructs the boot ROM 114B to determine that the programs and code that have been loaded into RAM are sufficient to be able to control and operate the machine 15. If the loaded software or system is valid as determined by the pattern file checksum routine, the boot ROM 114B then starts the system operating by jumping to a fixed address.

The file programs I and III as illustrated at 402 and 410 which are to be boot loaded into RAM consist of two parts. The first part is the header record 404 and 412 which tells the boot loader 114B where the files are to be loaded into memory. The second part is an actual binary memory image. The data is read from the floppy disk in 512 byte sectors. The header sector 404, 412 consists of a 512 byte (1 sector) data block which contains a multiple byte pattern, the size of the file in sectors, and a page and address of where the file is to be loaded into memory. The remaining 498 bytes of data can be used to contain file configuration information.

The machine 5 utilizes a read/write mass storage device, i.e. a rigid disk, to store the machine software and data. With the mass storage device comes the capability to easily read, write and modify files on the device. The files that constitute the system software control are stored on many remote storage devices such as the core printed wiring boards and I/O devices and must be gathered together to build a particular change of software control code or upgrade. This leads to the problem of gathering and managing the many files and the version numbers and attributes associated with those files while still providing the capability to easily update any one or a group of the files in the system for an upgrade. A mechanism was needed to manage the many different files, their associated versions and the update of these files. This mechanism also needed to provide a means of determining that the correct files were written to the mass storage device for a particular upgrade as well as a means to determine if any of the files had been corrupted or modified during the use of the system and to verify the configuration of the system at any point in time.

According to one aspect of the present invention, there has been implemented a Disk Organization and Configuration (DOC) file. Associated with many of the files on the mass storage device are attributes such as file type, file size and checksum. All of this information was used to create the DOC file, thereby defining the configuration of the system. This information is used to manage and build the file structure for the mass storage device. After the files have been written to the mass storage device, the DOC file is used to verify the configuration of the system. The verification of the system is facilitated by making the DOC file one of the files written to the mass storage device. This then provides a means to indicate what configuration that device should be in.

The DOC file provides a mechanism for collecting and managing the information about a particular system configuration, the identity and location of the remote file name and location of all of the files to be placed on the mass storage device, and the unique configuration information about each of the files including file size, file name to file ID mapping, file type and checksum. By making the DOC file one of the files specified within the DOC file, it becomes an integral portion of the released file structure and as such provides a valuable component of the installed software configuration. The DOC file allows programs to be written which automatically collects the files from their remote location and retrieves them into a central facility, verify that the files retrieved are actually of the desired configuration and transfers the files directly to the mass storage device or generates them into a software installation kit which would be used to transfer the files to a mass storage device installed in a copier at a customer location. When the DOC file and the files contained within it are transformed into a software installation kit (a collection of floppies instead of being put directly on the mass storage device), the contents of the DOC file are translated into two binary images. These binary images speed up processing during the software installation process (placing the contents of the floppies onto the mass storage device) and the configuration verification process. The two binary files which are generated are called the LU table and the LU to FID table. The LU table contains the information detailing the software configuration revision IDs, and information about file group revision numbers and types, and desired placement of the files on the mass storage device. The LU to FID table provides information about how the files are organized in the software installation kit, and provides information which is specific to the individual files such as file size, file type, and file checksum.

In general, the control code and information loaded into the machine from the rigid disk can be easily modified because it is stored in a central location on a media that has read/write access. In accordance with another aspect of the present invention, changing the data or control code, known as an upgrade, can be done by modifying the contents of the current rigid disk by transferring data from one or more floppy disks onto the rigid disk using the floppy disk drive in the machine.

A full upgrade consists of completely rewriting the entire contents of the rigid disk. An upgrade kit will contain all the information required to perform a full upgrade of all of the information on the rigid disk. The availability of the complete software set will allow the service rep to rewrite the entire disk in the event that information on the disk is not valid. The first disk of the upgrade kit is a bootable floppy which will contain the software necessary to perform the upgrade function and information about the contents of the upgrade (version numbers, files sizes, etc.) to determine which floppies will be required to complete the upgrade. The remaining floppies will contain the actual data that will be written to the rigid disk.

Floppy disks are broken into three categories, bootable, software upgrade or writable/readable data storage. Bootable floppies are floppies which contain information that the Boot ROM can use to load the user interface. This allows the service rep to run special software which is not stored on the rigid disk, such as the software upgrade tool. The bootable floppy may also contain software upgrade information and/or writable data storage files. Software upgrade floppies are floppies which contain the information to be loaded onto the rigid disk, including control code, frame information and language information. Writable data storage floppies can be used to save the NVM values for one or more machines. Writable data storage floppies can also be used to hold field data collection information.

The machine 5 is a multi-national machine with the user interface capable of displaying both graphics and textual messages. It is required to display text in two different languages (designated the primary and secondary languages). The textual (language) information is stored on the rigid disk and the user the capability to select between the primary or secondary languages that can be installed on a machine.

The upgrade kit has the ability to change the contents of the textual message data files for either the primary or secondary language, thereby changing the primary or secondary language that is displayed on the user interface for a particular software configuration. It provides the means to store files from the upgrade kit to one of two groups of files on the rigid disk. One group of files is for the primary language and the other is for the secondary language. Each group of files is called a language Logical Unit (LU). By grouping files associated with primary language into on LU and the files associated with the secondary language into a different LU, either of the languages could be changed without affecting the other.

In a preferred embodiment, there are four upgrade modes. They are full upgrade, incremental upgrade, primary language upgrade and secondary language upgrade. A full upgrade will replace all of the software on the rigid disk with the software contained in the upgrade kit. The full upgrade will take longer than a incremental upgrade because the incremental upgrade will replace only the software which has been changed. Portions of the code define messages and identifiers to be displayed in a given language. The language of these messages and identifiers can also be changed. A full upgrade will replace the language dependent information on the rigid disk with the language files that are part of the upgrade kit. Preferably, an incremental upgrade should not be used if a language change is desired. When either of the two language upgrades are selected, the language dependent information on the rigid disk will be replaced.

Figure 6A:
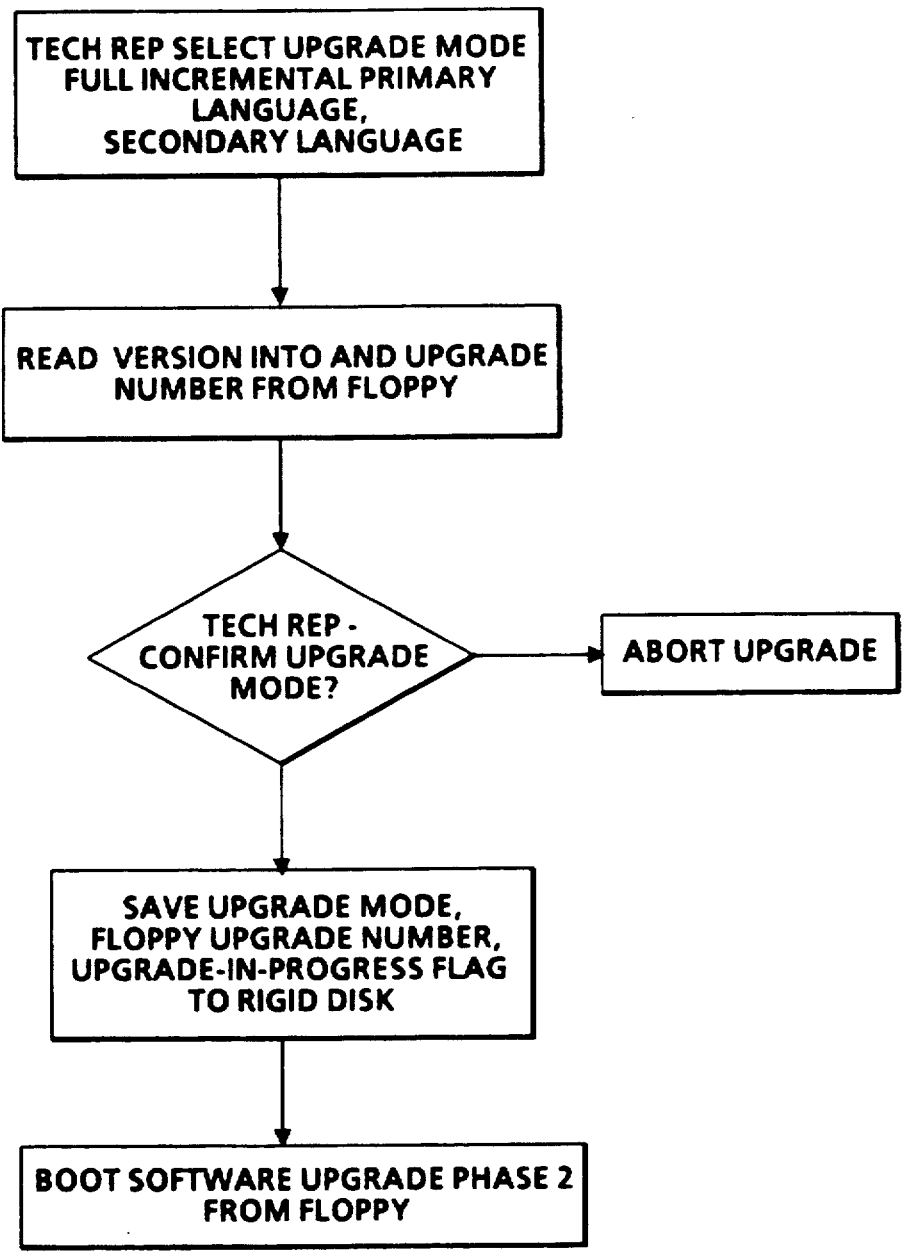
FIGS. 6A, 6B, 6C are flow charts of the control upgrading feature in accordance with the present invention.
Figure 6B:
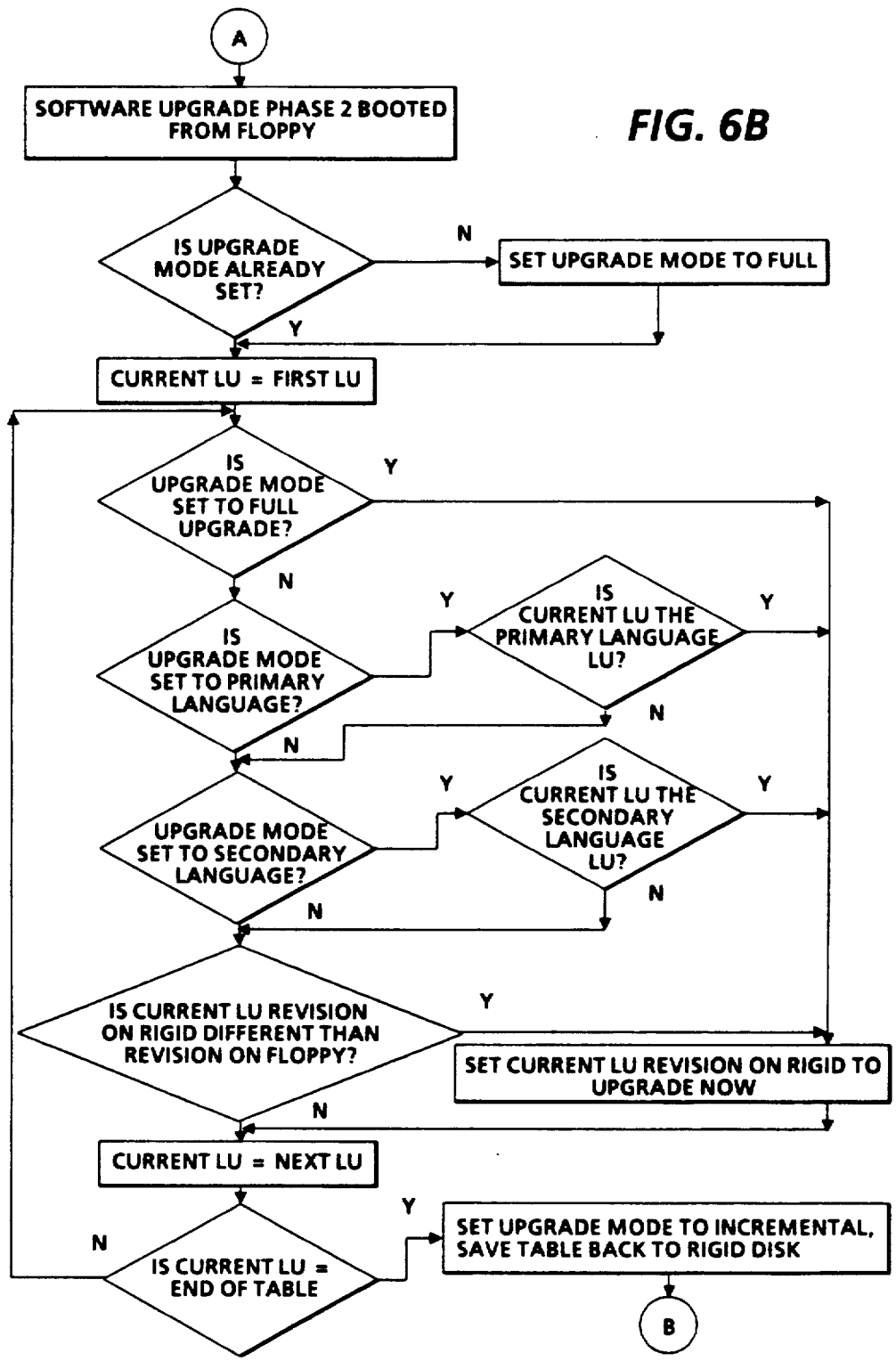
Figure 6C:
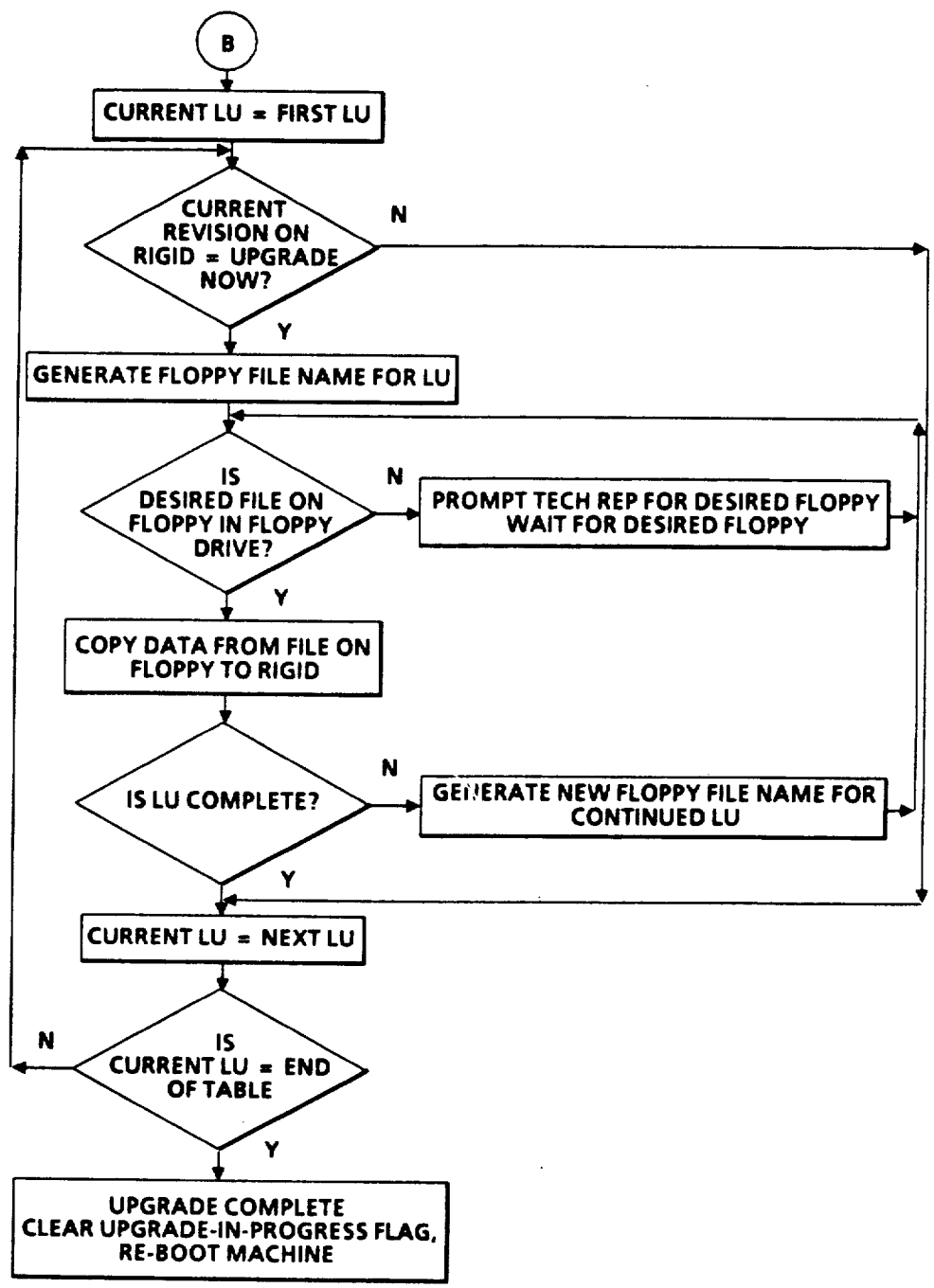

With reference to FIG. 6, once the upgrade mode is entered, the service rep will receive a message identifying the number of the floppies required to perform the upgrade. Confirmation will be requested that the service rep is still willing to proceed with the upgrade. If the service rep does not have the required floppies to perform the upgrade, then the upgrade must be aborted before it is started. Once the upgrade process has been started the machine will be unable to function until the upgrade process has been completed.

The software which performs the actual upgrade will be resident on the floppy disk, requiring the Boot ROM to boot from the floppy disk instead of from the rigid disk. To do this the Boot ROM will first check to see if there is a floppy disk in the floppy drive. If there is a floppy disk in the floppy drive, the Boot ROM will determine if the floppy is bootable. If it is bootable then it will boot from the floppy instead of the rigid disk. If the floppy is not bootable, it will boot from the rigid disk. If there is no floppy in the floppy drive, it will boot from the rigid disk. The boot from the floppy disk will be accomplished through the use of the boot record contained on the floppy disk.

The software upgrade tool consists of two phases of software. The first phase (phase one) is resident in the machine diagnostics code and is used at the start the software upgrade process. This phase runs as part of the normal machine and has the ability to interact with the service rep via the CRT and touch screen. This software is responsible for setting the upgrade mode (incremental/full/primary language/secondary language). When the mode is entered the service rep is requested to insert the first disk of the software upgrade kit. When the disk has been inserted, the software reads the version information off the floppy and the rigid disk and determines which floppies are required to perform the upgrade. If the confirmation is yes, then the upgrade type, the new upgrade number, and the upgrade-in-progress flag will be stored on the rigid disk as the first record of a logical unit table. Then the floppy resident portion of the software upgrade tool will be read off a the floppy and started.

When the second phase (phase two) of the software upgrade tool has been read off the floppy and started, it will check to see if the upgrade-in-progress flag has been set. If this flag has not been set, then the upgrade mode will default to a full upgrade. If the upgrade-in-progress flag has been set then phase two will verify that the upgrade number which was saved on disk by phase one is the same as the upgrade which is currently in the floppy drive. If the version check passes, then the selected upgraded mode is performed. When an incremental or full upgrade is performed, the upgrade will install all of the files necessary to run the machine, this includes the primary language. When the entire upgrade process is completed and verified, then the upgrade-in-progress flag will be cleared and suitable pattern tables will be corrected and rewritten to the rigid disk. Normal machine operation can begin by forcing the machine to reload from the new data stored on the rigid disk by turning the machine off and then back on again without a bootable floppy in the floppy drive.

If the desired upgrade is the full upgrade, then the tables on the disk will be modified to force all of the files to be reloaded. Then the upgrade mode indication on the rigid disk will be changed to incremental upgrade. This way if the machine crashes before completing the upgrade the upgrade software will not attempt to rewrite all the files on the rigid disk, just the files which had not been upgraded.

If for some reason the upgrade process fails to complete, the machine will not be permitted to enter normal operation. Normal operation is not allowed because the data on the rigid disk may be incompatible for normal machine operation due to partial loading of the new data for the rigid disk. The upgrade can be completed or a new version of software installed by inserting the first disk of the software upgrade kit (the bootable floppy) into the floppy drive. The Boot ROM will boot the machine from the floppy disk and phase two of the software upgrade tool will continue the upgrade from where it left off. If the version of the upgrade it does not match the version of the upgrade which was in progress, then the service rep will be informed of the difference and given a choice doing a full upgrade with the current version of software or aborting and trying again with the disks from the upgrade which was previously stared.

Logical Units (LUs) are a method of organizing the control software into related groups. The advantages to logical units are that software that is related to a specific language can be contained in one or two LU's thus making it easier to upgrade. By grouping files that are related into a single LU it also cuts down on the number of revision entries that must be maintained.

LU's will be stored consecutively on the floppy disks, and will be upgraded in order based on LU number. The LU map file on the floppy disk will contain the location on the rigid disk to place each LU, or it will contain a special value indicating that this LU should be placed directly after the previous LU. It is the responsibility of the creator of an upgrade kit to allow sufficient space when allocating the LU map to allow for bad blocks. If an LU increases in size, then the location of the LU's following it must be adjusted unless there is sufficient unallocated space left between the LU's. If the LU location is not specified and the LU is larger than the current LU, then the LU will over write part of the next LU. Each LU can have extra, unused space at the end. This can be done either by specifying the starting address of the LU in the LU map on the floppy or by padding the LU length to force the last file to be larger than normal. If the increase in size does not exceed the previously allocated unused space, then the next LU will not have to be shifted. The smallest upgradable unit on the rigid disk will be an LU. Files within a LU can not be upgraded individually. An upgrade will consist of at least one LU, otherwise, it can not be considered an upgrade.

Each floppy disk will be identified with a volume label which will identify the disk number within an upgrade kit. The volume name will contain sufficient information to uniquely identify both the volume number of the disk and the upgrade number of the upgrade kit. The volume and upgrade numbers will be used for consistency checking while the upgrade is being done. The boot floppy is always the first volume of the upgrade kit and is a bootable floppy. It will contain the DOS, a pattern table, a software upgrade program, a floppy disk LU table and a LU to file ID table, and a default boot record. The remaining floppies will contain the information to upgrade the floppy. Each of these floppies; will have a directory of the files contained on it. The floppy disk LU table is stored on the first floppy of the upgrade kit (the bootable floppy) with the file name LU table upgrade number, where the upgrade number is the upgrade kit's internal upgrade number as identified by the volume label of the boot floppy. The LU to File ID table is stored on the first floppy of each upgrade kit in a file called LU to FID upgrade number, where upgrade number is the upgrade kit's internal upgrade number as identified by the Volume label of the boot floppy.

The rigid disk will contain two files that will be used for upgrading the rigid disk from floppy. These files do not have a fixed place on the rigid disk but they do have a fixed file ID. This will allow for location of the files to be determined through the use of the rigid disk directory. The first file will be a LU table that is similar to that of the floppy disk. It will allow the upgrade software to determine the starting location, length and revision level of each LU on the rigid disk. The second file is identical to the LU to File ID table that is stored on the floppy disk. It contains information to determine the file ID's and size of each file contained within each LU.

When generating the upgrade kit it must be determined which files to be stored on the rigid disk are to be stored in each LU. When the files are stored on the floppy disk as part of an upgrade kit, they are stored as a series of files as LU's. Each LU contains one or more files, therefore, there must be some way to determine which files are stored in each LU, and the size of each of those files. This information is stored in the LU to FID (File Identifier) table, and is used to build each LU. Each individual LU file is generated by taking each of the constituent files (as defined by the LU to FID table), extending them to a 256 byte offset, and then concatinating them into a single file and then filling in the size field for the appropriate entry in the LU to FID table.

When the individual LU fields are generated they are copied onto floppy disks. These disks make up the majority of the Software Upgrade kit. The LU files are stored on disk starting with volume 2 of the upgrade kit. (Volume 1 is used to store the software upgrade tool and the LU table and LU to FID table). If an LU will not fit on a single floppy disk, then it is broken up into pieces which will fit on a single floppy. These pieces, called continued files, must be stored on sequential floppies. The file name of the pieces indicate in which order they should be stored onto floppies. Each floppy must have a unique volume label which indicates both the upgrade kit's internal number and the volume number.

The desired starting location of an LU on the rigid disk can be entered into the LU table. The LU table is written in order by LU number. LU's should be stored in sequential order on the rigid disk, because the upgrade software uses the LU number to determine if they LU will overwrite the previous and next LU's. When defining the entries in the LU table for language dependent information, sufficient space must be reserved to store the largest of the languages which could be installed. This must be done because if sufficient space is not reserved for the language dependent information then the language upgrade could fail due to insufficient space to store the language information.

The method of providing both a primary and a secondary language on the rigid disk and to the method of changing the system files to be able to change either the primary or secondary language or both on the rigid disk to another language, and to provide the operator with the option of selecting either the primary or secondary language as the medium for the display messages and prompts is done by providing the language requirements on a floppy disk, identifying the specific files of the control to be altered to produce the language requirements, loading the floppy disk into a floppy disk drive, and transferring the language requirements to the rigid disk.

In operation, the control stores language files from a specified floppy disk to one of two groups of files on the rigid disk, each group of files being a logical unit (LU). One LU is for the primary language, and the other LU is for the secondary language, and by separating the groups of files, either of the languages can be changed separately by merely changing the associated LU. The language installation or change procedure is simplified by using the language file identification (ID) number or name to designate whether the language is primary or secondary, rather than relying on the contents of the language file to determine primary or secondary status. A separate file called the Logical Unit to File Identification table (LU to FID) table makes the correlation between the language LU file and the desired file IDs on the rigid disk. Multiple LU to FID table entries make it possible to place the language files in different file ID's depending upon the LU to FID table selected. One LU to FID table entry would have the file ID's which correspond to the primary language and another entry would have the file ID's which correspond to the secondary language.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In a control having a user interface with display for providing operator prompts and a plurality of control files organized into logical units including a primary language file and a secondary language file for providing operator prompts in either the primary or the secondary language, a portion of the control files being stored on a mass memory device, the method of changing one of the language files comprising the steps of:

providing a document file having an identifier related to one of said primary or secondary language files for loading in the mass memory device.

loading the document file into the mass memory device, providing data associated with one of said primary or secondary language files, and changing one of said primary or secondary language files in the mass memory device in accordance with the document file identifier and assciated data, wherein the step of changing one of the language files includes the step of comparing a version number in the document file for a selected control file of a selected logical unit with a version number of the equivalent control file of the equivalent logical unit on the mass memory device and if the version numbers are different, overwriting the selected control file on the mass memory device with the control data of the corresponding control file on one of the floppy disks, the additional allocated memory space allowing overwriting smaller control files with larger control files.

2. The method of claim 1 including the step of allocating predetermined additional memory space for said one of said primary or secondary language files on the mass memory device.

3. The method of claim 1 wherein the step of loading includes the step of transferring the document file from a floppy disk to the control random access memory.

* * * * *